(12) United States Patent
Selling et al.

(10) Patent No.: US 11,707,064 B2
(45) Date of Patent: Jul. 25, 2023

(54) METHODS OF KILLING NEMATODES

(71) Applicant: United States of America as Represented by the Secretary of Agriculture, Washington, DC (US)

(72) Inventors: Gordon W. Selling, Dunlap, IL (US); William T. Hay, Peoria, IL (US); George F. Fanta, Morton, IL (US); Susan L. Meyer, Columbia, MD (US); Inga A. Zasada, Corvallis, OR (US)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 448 days.

(21) Appl. No.: 16/842,007

(22) Filed: Apr. 7, 2020

(65) Prior Publication Data

US 2020/0323200 A1 Oct. 15, 2020

Related U.S. Application Data

(60) Provisional application No. 62/831,811, filed on Apr. 10, 2019.

(51) Int. Cl.
*A01N 33/12* (2006.01)
*A01N 25/10* (2006.01)

(52) U.S. Cl.
CPC .......... *A01N 33/12* (2013.01); *A01N 25/10* (2013.01)

(58) Field of Classification Search
CPC ........ A01N 43/16; A01N 33/12; A01N 25/10; A61L 15/28
See application file for complete search history.

(56) References Cited

U.S. PATENT DOCUMENTS

2017/0360040 A1* 12/2017 Kost .................... C09D 103/14
2019/0014780 A1* 1/2019 Hay ....................... A01N 43/16

OTHER PUBLICATIONS

Gupta et al. (Biopesticidal value of selected essential oils against pathogenic fungus, termites and nematodes, International Biodeterioration & Biodegradation; 65 (2011) pp. 703-707). (Year: 2011).*
Eller, F.J. et al., "Hexadecyl ammonium chloride amylose inclusion complex to emulsify cedarwood oil and treat wood against termites and wood-decay fungi" International Biodeterioration & Biodegradation, 2018, 129: 95-101.
Hay, W. T. et al., "Antifungal Activity of a Fatty Ammonium Chloride Amylose Inclusion Complex against Fusariumsambucinum; Control of Dry Rot on Multiple Potato Varieties.", American Journal of Potato Research, 2019, 96: 79-85.
Hay, W. T. et al., "Antimicrobial properties of amylose-fatty ammonium salt inclusion complexes" Carbohydrate Polymers, 2020, 230:115666, 1-11.

* cited by examiner

*Primary Examiner* — Robert A Wax
*Assistant Examiner* — Danielle Sullivan
(74) *Attorney, Agent, or Firm* — John Fado; Matthew Bussan

(57) ABSTRACT

Provided herein are methods for killing nematodes, said method comprising contacting said nematodes with an effective nematodes killing amount of a fatty-ammonium salt polysaccharide inclusion complex, and optionally a carrier. The fatty-ammonium salt starch inclusion complexes comprise one or more of a variety of fatty amines.

12 Claims, 2 Drawing Sheets

METHODS OF KILLING NEMATODES

REFERENCE TO RELATED APPLICATION

This application claims the benefit of U.S. Provisional Application No. 62/831,811, filed 10 Apr. 2019, which is incorporated herein by reference in its entirety.

BACKGROUND OF THE INVENTION

Field of Invention

Provided herein are fatty-ammonium salt/starch inclusion complexes comprising one or more of a variety of fatty amines. The inclusion complexes of the present invention can beutilized as nematocidal agents, preventing nematode hatching, their growth, and their damage to roots. In specific embodiments, a solution of the inclusion complexes of the present invention are applied to plants in the field or greenhouse (e.g., by adding the solution to the soil around the plants) or by applying the inclusion complex to a seed as a coating to reduce damage caused by nematodes.

Background

Starch is an inexpensive, biodegradable plant-based polysaccharide that has many applications in food and material science. Starch is composed of repeating glucose units and is comprised of two fractions, amylose and amylopectin. The amylose fraction is a linear polysaccharide with alpha-(1→4)-glucan linkages, while the amylopectin fraction is a highly branched alpha-(1→4)-glucan with alpha-(1→6)-branch points (Tester et al., J. Cereal Sci., 39; 151 (2004)). Amylopectin is typically the major component of normal food grade corn starch, with amylose typically constituting 15-30% of the starch. Starches containing greater than 40% amylose are defined as high-amylose starches, while starches containing <1% amylose are defined as waxy starches (Bates et al., J. Am. Chem. Soc., 65: 142 (1943)).

When dissolved, amylose can form inclusion complexes with hydrophobic ligands such as fatty acids and fatty amines (Godet et al., J. Food Sci., 61: 1196 (1996); Helbert & Chanzy, J. Biol. Macromolecules, 16: 207 (1994); Obiro et al., Food Rev. Int'l., 28: 412 (2012)). The left handed helices formed by amylose in solution have a hydrophobic internal cavity where hydrophobic ligands can reside (Saenger, Naturwissenschaften, 71: 31 (1984)). Structurally, the inner surface of the helix is comprised of methylene groups and glycosidic linkages, while the hydrophilic hydroxy groups are located on the outer surface (Immel & Lichtenthaler, Flexible and Rigid Non-Glucose Cyclooligosaccharides: Synthesis, Structure, and Properties, 52: 27 (2000)); Obiro et al., supra). In the presence of suitable ligands, amylose-inclusion complexes can form when the hydrophobic portion of a ligand associates with the hydrophobic internal cavity of the amylose helix by van der Waals forces (Nimz, et al., Carbohydr. Res., 339: 1427 (2004)). Previous studies have suggested that a minimum chain length of 10 carbons is necessary for complex formation, with an ideal chain length between 14 and 18 carbons (Godet et al., Int'l J. Biol. Macromolecules, 17: 405-408 (1995); Krog N., Starch-Stärke, 23: 206 (1971)).

Amylose-inclusion complexes are categorized into two main types, type I and type II. Type I complexes are randomly oriented structures with no distinct crystalline regions. They are typically formed at lower temperatures (<90° C.) and are partially ordered. Type II complexes are semicrystalline with distinct crystalline and amorphous regions and are formed al temperatures near 90° C. (Biliaderis & Seneviratne, Polymers, 13: 185 (1990); Tufvesson & Eliasson, Carbohydr. Polymers, 43: 359 (2000)). Amylose-inclusion complexes can be produced using microwave processing (Felker et al., Starch/Starke. 65: 864 (2013)) or the commonly used industrial method of steam jet cooking (Klem & Brogly, Pulp and Paper, 55:98-103 (1981)). Using the steam jet cooking technique, water dispersions of granular starch are heated at high temperature with high-pressure steam under high-shear conditions to dissolve the starch. The desired ligand is then added to the resulting starch solution to form the amylose inclusion complex (Fanta et al., Carbohydrate Polymers, 38: 1 (1999)). While fatty acid inclusion complexes produced in this fashion will form insoluble spherulites when cooled, amylose-fatty acid salt inclusion complexes are water soluble and can be dried and easily re-dissolved in water (Fanta et al., Carbohydr. Polymers, 81: 645 (2010); Fanta et al., Carbohydr. Polymers, 98: 555 (2013)).

The formation of amylose inclusion complexes with N-1-hexadecylammonium chloride using steam jet cooking and isolation using freeze drying has been previously described (Fanta et al., Carbohydrate Polymers, 98: 555 (2013)). Alternatively, spray drying can be used to isolate the amylose complexes (Hay et al., Carbohydr. Polymers, 161: 140 (2017)). A $6_1V$ x-ray diffraction pattern was observed after complex formation, as well as an inhibition of retrogradation due to electrostatic repulsion between amylose helices. Blending the water soluble amylose N-1-hexadecylammonium chloride complexes (Hex-Am) with polyvinyl alcohol (PVOH) has been demonstrated to produce composite films with high tensile strength, high % elongation, and increased water contact angle (Fanta et al. I. J. Appl. Polymer Sci., (2016) DOI 10.1002/APP.44110; Fanta et al. II, Starch/Starke, 68: 874 (2016)). Alternatively, these complexes can be made using microwave techniques (Felker et al., Starch/Starke 65: 864 (2013)) utilizing microwave irradiation to provide the necessary thermal energy to gelatinize the starch and allow complex formation to occur.

Nematicides are often very toxic chemicals which kill even non-target nematodes in soil (Chitwood, D. J., 2003, Nematicides, Pages 1104-1115, IN: J. R. Plimmer, ed., Encyclopedia of Agrochemicals, Vol. 3, New York, John Wiley & Sons). Methyl bromide has been used for decades as a soil sterilizer; however, it is very damaging to the ozone layer and is being phased out (Santos, B. M., and J. P. Gilreath, CAB Reviews: Perspectives in Agriculture, Veterinary Science, Nutrition and Natural Resources, 1: 57 (2006)). Detailed below are other compounds that have been evaluated as alternatives to methyl bromide; these are all toxic, flammable, or have other issues regarding their use or their production:

Dimethyl disulfide (Heller, J. J., et al., Acta Horticulturae, 842: 953-956 (2009));

Ozone (Qiu, J. J., et al., Journal of Nematology, 41(3): 241-246 (2009));

Methyl iodide (Farwell, A. P., and J. L. Leonard, Inhalation Toxicology, 21(6): 497-504 (2009));

Allyl isothiocyanate (Bangarwa, S. K., et al., Weed Technology, 25(1): 90-96 (2011));

Ethyl formate (Yang, J. O., et al., Journal of Economic Entomology, 109(6): 2355-2363 (2016));

Phosphine (Yang, J. O., et al., Journal of Economic Entomology, 109(6): 2355-2363 (2016));

Chloropicrin (Ceustermans, A., et al., Acta Horticulturae, 883: 135-144 (2010));

Metam sodium/potassium (Ceustermans, A., et al., Acta Horticulturae, 883:135-144 (2010));

1,3-Dichloropropene (Ceustermans, A., Acta Horticulturae, 883: 135-144 (2010)); and Dazomet (Ceustermans, A., et al., Acta Horticulturae, 883: 135-144 (2010)).

Steam has been used to sterilize soil, unfortunately its use entails high cost (Rainbolt, C. M., et al., HortTechnology, 23(2): 207-214 (2013)).

Thus there continues to be a need for a safe, environmentally friendly nematicides. As detailed in U.S. patent application Ser. No. 16/028,849 (2018), which is incorporated by reference in its entirety, amylose complexes having fatty ammonium salts have antimicrobial and fungicidal activity. However, it was not anticipated that these complexes would have nematocidal activity.

Presented herein, we provide new uses as nematocidal agents for fatty-ammonium-starch inclusion complexes.

SUMMARY OF THE INVENTION

Provided herein, in one embodiment, is a method of killing nematodes and a method of decreasing nematode population densities on a plant or in soil, by applying an effective amount of a fatty-ammonium salt polysaccharide inclusion complex. In some instances, the polysaccharide portion of the inclusion complex is amylose (such as from high amylose corn starch). In any embodiment provided herein, the fatty amine portion of the inclusion complex is derived from one or more fatty ammonium salts, where each fatty ammonium salt comprises about eight to about twenty-two carbons in at least one chain attached to a nitrogen. In some embodiments, the one or more fatty ammonium salts comprise about twelve to about eighteen carbons. In still other embodiments, the fatty amine portion of the inclusion complex is an amine with two carbon chains attached to a nitrogen and the two chains have from about 1-18 carbons each (total number of carbons in the two chains will be between about 10 and about 20). Amines used to derive ammonium salts useful in some embodiments of such methods can be primary, secondary, tertiary, or quaternary. In some embodiments where the amine is a secondary, tertiary or quaternary amine comprising a first chain of about twelve or more carbons (e.g., up to about 20), the second, third and fourth alkyl groups attached to the nitrogen have about four to about 1 carbon and the second, third, and fourth alkyl groups do not have hydroxyl groups. Fatty-ammonium salts useful in the present invention can contain chloride, bromide, or sulfate counter ions. In particular embodiments, the specific fatty-ammonium salt utilized is N-1-octadecylammonium chloride, N-1-dodecylammonium chloride, N-1-tetradecylammonium chloride, N-1-hexadecylammonium chloride, N-hexadecyl-N,N,N-trimethylammonium bromide, or N-1-octadecylammonium chloride. In a specific embodiment, the fatty-ammonium salt is N-1-hexadecylammonium chloride and is present at a concentration of about 3 to about 9% of the polysaccharide portion of the inclusion complex. For these particular embodiments, the polysaccharide portion of the inclusion complex can be amylose. These methodologies can be utilized to control nematodes.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the claims. Features and advantages of the present invention are referred to in the following detailed description, and the accompanying drawings of which:

DETAILED DESCRIPTION OF THE INVENTION

Figure 1:
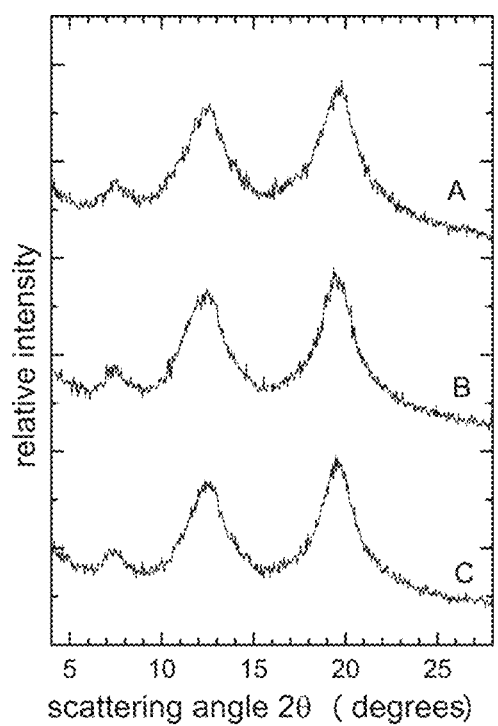
FIG. 1 provides x-ray diffraction patterns of starch complexes prepared with (A) N-1-dodecylammonium chloride (C12), (B)N-1-hexadecylammonium chloride (C16,), and (C) N-1-octadecylammonium chloride (C18) as described below.

Provided herein, in one embodiment, are fatty-ammonium salt-starch inclusion complexes that can be utilized as nematocidal agents. Inclusion complexes of the present invention can be made with fatty amines having variable carbon chain lengths from about 8 carbons long to about 22 carbons long, and mixtures thereof. Complexes of the present invention can utilize primary, secondary, tertiary, and quaternary amines, or a combination of these.

Preferred embodiments of the present invention are shown and described herein. It will be obvious to those skilled in the art that such embodiments are provided by way of example only. Numerous variations, changes, and substitutions will occur to those skilled in the art without departing from the invention. Various alternatives to the embodiments of the invention described herein may be employed in practicing the invention. It is intended that the included claims define the scope of the invention and that methods and structures within the scope of these claims and their equivalents are covered thereby.

Technical and scientific terms used herein have the meanings commonly understood by one of ordinary skill in the art to which the instant invention pertains, unless otherwise defined. Reference is made herein to various materials and methodologies known to those of skill in the art. Any suitable materials and/or methods known to those of skill can be utilized in carrying out the instant invention. Materials and/or methods for practicing the instant invention are described. Materials, reagents and the like to which reference is made in the following description and examples are obtainable from commercial sources, unless otherwise noted.

As used in the specification and claims, use of the singular "a", "an", and "the" includes plural references unless the context clearly dictates otherwise.

A wide range of application rates of the compositions may be suitable in accordance with the present methods. Those working in this field would of course be readily able to determine in an empirical manner the optimum rates of application for any given combination of target nematodes to be killed or eliminated. The amount of composition used will be at least an effective amount to reduce and/or kill nematodes. The term "effective nematodes killing amount" as used herein, means the minimum amount of composition needed to reduce and/or kill nematodes on or in plants (e.g., roots) or in or on soil. Of course, the precise amount of the composition needed will vary in accordance with the particular composition used; the type of object to be treated; the number of days of effectiveness needed; and the environment in which the object is located. The precise amount of the composition can easily be determined by one skilled in the art given the teaching of this application. Other compounds may be added to the composition provided they do not substantially interfere with the intended activity of the composition; whether or not a compound interferes with activity can be determined, for example, by the procedures described below.

The term "nematocidal", and grammatical variations thereof, refers to the ability of a composition of the present invention to impede growth of a nematode, or kill a nematode, when present in an effective amount. "Nematocidal" refer specifically to the capability of a composition to impede growth of nematodes, or kill nematodes, when present in an effective amount.

The amounts, percentages and ranges disclosed herein are not meant to be limiting, and increments between the recited amounts, percentages and ranges are specifically envisioned as part of the invention. All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10 including all integer values and decimal values; that is, all subranges beginning with a minimum value of 1 or more, (e.g., 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

Unless otherwise indicated, all numbers expressing quantities of ingredients, properties such as molecular weight, reaction conditions (e.g., reaction time, temperature), percentages and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention. As used herein, the term "about" refers to a quantity, level, value, or amount that varies by as much as 10% to a reference quantity, level, value, or amount. For example, about 1.0 g means 0.9 g to 1.1 g and all values within that range, whether specifically stated or not.

The optional carrier may be, for example, agronomically or physiologically or pharmaceutically acceptable carriers known in the art. The carrier or carrier material as used herein is defined as not including the body of an insect (e.g., nematode).

Contacting or exposing nematodes, plants, or soil with the nematocidal composition described herein (to reduce and/or kill nematodes) may occur by conventional methods such as spraying.

"Optional" or "optionally" means that the subsequently described event or circumstance may or may not occur, and that the description includes instances in which said event or circumstance occurs and instances where it does not. For example, the phrase "optionally comprising a nematode attractant" means that the composition may or may not contain a nematode attractant and that this description includes compositions that contain and do not contain a nematode attractant. Also, by example, the phrase "optionally adding a nematode attractant" means that the method may or may not involve adding a nematode attractant and that this description includes methods that involve and do not involve adding a nematode attractant.

Fatty Amine/Polysaccharide (Starch) Inclusion Complexes

Fatty amines utilizable in practicing the inventions disclosed herein include primary, secondary, tertiary, and quaternary amines. They can be derived from natural sources, or be made synthetically. Such fatty amines can have carbon chains from about 8 carbons long to about 22 carbons long, including 8, 9, 10, 11, 12, 13, 14, 15, 16, 17, 18, 19, 20, 21, and 22 carbon atoms, and mixtures thereof. Preferred embodiments include primary ammonium salts with between about twelve and about eighteen carbons. The most preferred ammonium salt is N-1-hexadecylammonium chloride. Fatty amines can be utilized as any relevant salt including, but not limited to, chlorides, bromides, and sulfates. Fatty amines can be converted to ammonium salts in solution via the addition of equimolar amounts of suitable acid (e.g., hydrochloric acid (HCl)). Alternatively, the quaternary ammonium salt can be produced by reaction of a primary, secondary, or tertiary amine with suitable amount of alkylating reagent (e.g., dimethyl sulfate, methyl iodide) or other electrophilic process (e.g., reaction with formaldehyde and reduction or other reductive aminations) under conditions which will give tetravalent nitrogen (e.g., an ammonium salt). When made in this fashion, the ammonium salt will not be able to readily convert back to the base by sensible modification of pH. In the formation of the fatty ammonium salts—starch complexes utilized to practice the embodiments disclosed herein, fatty ammonium salts can be added at about 1.5% to about 20% of the mass of starch. Preferably, the amount is between about 3% to about 10% fatty ammonium salt, and most preferably about 5% (roughly equivalent to about 7.5% of the mass of the amylose component of the starch utilized).

In embodiments where branched fatty ammonium salts are utilized, preferred salts will have at least one carbon chain of ≥10 carbons attached to the nitrogen molecule. Functionalities (e.g., esters) can be present within the carbon chain of ≥10 carbons. Typically, wherein two or more alkyl chains are attached to the nitrogen molecule of the fatty amine, each of the chains will have from about 1-18 carbons each (total number of carbons in the two chains will be between about 10 and about 20). Preferably, alkyl chains attached to the nitrogen of the fatty amine will not have hydroxyl groups. Fatty ammonium salt portions of inclusion complexes can comprise a mixture of fatty ammonium salts.

Any suitable polysaccharide can be utilized in making the fatty ammonium salt—polysaccharide complexes of the present invention. In preferred embodiments, the polysaccharide is a starch comprising predominantly alpha-(1→4)-glucan linkages, such as amylose (commonly found in plant starches, such as corn and wheat starch), waxy corn starch, potato starch, wheat starch, rice starch, and tapioca starch, or dextrins (dextrin, dextrin 2, dextrin 3). Amylose utilized in making the fatty ammonium salt—amylose complexes of the present invention can range from about 20 to about 75% and can be from any suitable source (e.g., high amylose corn starch). Preferred embodiments utilize amylose from corn starch, where the percentage of amylose can vary from about 20 to about 80%, with the remainder being amylopectin. The most preferred embodiments utilize high amylose corn starch (about 60 to about 80% amylose).

Suitable polysaccharides preferably have sufficient linear non-branched repeat units to allow formation of a complex with a chosen fatty ammonium salt, as evidenced by the presence of two peaks in x-ray diffraction spectra of the complex where one peak is found between 12.5 and 13.5 2θ the other peak is found between 19.75 and 20.75 2θ (see, e.g., FIG. 1). In embodiments utilizing fatty quaternary ammonium salts, when about 3 to about 9% of the quaternary salt is combined with a chosen polysaccharide and thermally processed, the resulting complex can form at least a 3% solids solution with water.

Fatty-ammonium salt/amylose inclusion complexes are known in the art and are generally prepared by steam jet cooking and microwave preparation methodologies. Steam jet cooking of starch is generally described in the art (Klem & Brogley, supra). In such methodologies, a starch such as high amylose corn starch in water is passed through a steam jet cooker operating under excess steam conditions (Fanta et al., Carbohydr. Polymers, 98: 555 (2013)). Hot, jet cooked starch solutions are collected in a container. Solutions of fatty ammonium salts are prepared separately by dissolving the salt in water or combining the fatty amine with an acid (e.g., HCl) in concentrations sufficient to fully convert the amine to its ammonium salt. Typically, the fatty ammonium salt solutions are heated (e.g., to 90° C.) to ensure maximum solubilization, and are then mixed with the hot starch solution. The combination is then cooled prior to drying, with freeze drying and spray drying being preferred drying methods. Specific steam jet and microwave methodologies are detailed in the Examples below, but any methodology known in the art can be utilized to form the inclusion complexes of the present invention.

Nematocidal Applications

Many of the fatty-ammonium salt—amylose inclusion complexes of the present invention can be utilized as nematocidal agents. Such inclusion complexes can be applied alone, or in formulations with other agents (e.g., other nematocidal agents). For embodiments in which the inclusion complexes are utilized as nematocidal agents, the complexes can be applied to the soil as a solution or by applying the nematocidal complex to the seed as a coating. Inclusion complexes of the present invention can be formulated as aqueous compositions for application to soil or the seed. The inclusion complex can also be applied to the seed as a powder coating. When using one of the preferred types of polysaccharide, high amylose corn starch, then aqueous solutions of about 0.5 to about 4.5% inclusion complex (w:v) are preferred. The concentration (% solids) of the aqueous solution will be dependent on the solubility and flow properties of the inclusion complex—much of which will be driven by the polysaccharide. This may allow for higher concentrations of inclusion complex, which would result in lower cost.

Generally, a fatty-ammonium salt—amylose inclusion complex will be applied to a plant or to soil in an amount effective to impede or kill 25-100% of nematodes, as compared to control plants. As described in the Examples, the effective amount of any complex of the present invention can be determined by exposing one or more nematodes to the complex and determining the minimum inhibitory concentration (MIC). In preferred embodiments, an inclusion complex of the present invention inhibits 50-100% of nematodes when present in an effective amount.

The following examples are intended only to further illustrate the invention and are not intended to limit the scope of the invention as defined by the claims.

EXAMPLES

Example 1

Materials and Analytical Methodologies

High amylose corn starch with a reported amylose content of 68% (determined by iodine binding (Jane et al., Cereal Chem., 76: 629 (1999)) was obtained from Cargill, Minneapolis, Minn.; N-1-dodecylamine (98%), N-1-hexadecylamine (98%), and N-1-octadecylamine (97%) from Sigma-Aldrich. The moisture contents of starch (9.4%) were determined by weight loss after drying under vacuum for 4 hours at 100° C.

X-ray diffraction spectra analyses were performed using a Bruker D2 134 Phaser (Bruker AXS Inc., Billerica, Mass.) X-ray diffractometer. The X-Ray source was Cu-Kα radiation at a current of 10 mA and 30 kV, set up using θ/θ geometry. Samples were scanned at 5-30°, 2θ, step size 0.01°, 0.2 s/step, and stage rotation 10 rpm. Initial divergence slit size was 0.6 mm and a 1 mm air scatter screen was used above the sample. A Lynxeye™ detector was used with a 2.5° Soller slit and a Ni-Kβ filter.

Amylose-Fatty Ammonium Salt Complex Preparation

The procedure used for steam jet cooking was the same as previously reported (Fanta et al., J. Carbohydr. Polymers, 81: 645 (2010)). A dispersion of 50.0 g of high amylose starch in 900 mL of deionized water was passed through a Penick & Ford (Penford Corp., Englewood, Colo.) laboratory model steam jet cooker operating under excess steam conditions (hydroheater was 140° C., steam back pressure 380 kPa (40 psig), steam line pressure 550 kPa (65 psig), and pumping rate 1 L/min (Klem & Brogley, Pulp Pap., 55: 98 (1981)). The amount of high amylose starch can be increased to provide more material of interest; this would require an equivalent increase in the amount of ligand as well.

Solutions of the HCl salts of fatty amines were prepared by dispersing 2.6 g of fatty amine in 100 mL of deionized water solution with an HCl concentration equal to that required to convert the amine to its ammonium salt. This weight of fatty amine was equal to 7.5% of the weight of amylose in 50.0 g of high amylose corn starch. The acidified amine dispersions were then heated to 90° C. to obtain clear solutions. The hot solutions of fatty ammonium salts were then added to the hot starch dispersions. The dispersions were blended for 1 min and then cooled in ice water to 25° C. The amylose-ammonium salt complex was then isolated by freeze-drying. The amylopectin component of high amylose corn starch was not separated from the amylose complexes since removal of amylopectin would not be practical in a commercial process.

X-ray diffraction patterns of the freeze-dried water soluble products (FIG. 1) showed similar $6_1V$ reflections at 7.5°, 12.5° and 20° 2θ confirming the formation of amylose inclusion complexes from the three fatty ammonium salts (A-C12, B-C16 and C-C18).

Micro Wave Production of Amylose-Complexes

An Ethos 1600 (Milestone Inc., Momoe, Conn.) microwave reactor oven was used to irradiate ~3% solids (m/m) mixtures of starch and various ligands in deionized water. The ligand was either a pre-made fatty ammonium chloride salt or a fatty amine which was added to the starch, followed by an equal molar amount of 1.035 M HCl.

Specific quantities are detailed for each Example. The reactor vessel was a sealed 270 mL perfluoroalkoxy Teflon® reactor vessel (Milestone Inc. product code 45161.T) and continuously stirred using a Teflon® magnetic stir bar at maximum speed. The sample must be heated sufficiently to gelatinize the starch; in this work the sample was heated from 0° to 120° C. in 1.5 min, 120° to 140° C. in 1.5 min after which the reaction vessel was cooled to 100° C. and maintained at 100° C. for 60 min (other heating conditions may be employed to maximize production efficiencies). The reactor vessel was then cooled in an ice bath until the sample reached room temperature. Samples were then centrifuged for 20 minutes at 1,400×g and the supernatant was collected and freeze dried using a Labconco Freezone 6 Liter freeze dryer (Labconco, Kansas City, Mo.).

Example 4

Nematocidal Testing of Amylose-Inclusion Complexes
Amylose Inclusion Complex Production Steam jet production of N-1-hexadecylammonium chloride amylose inclusion complex: A dispersion of 110.4 g of high amylose starch (~9.4% moisture) in 1800 mL of deionized water was passed through a Penick & Ford (Penford Corp., Englewood, Colo.) laboratory model steam jet cooker operating under excess steam conditions (hydroheater temperature 140° C., steam back pressure 380 kPa (40 psig), steam line pressure 550 kPa (65 psig), and pumping rate of 1 L/min. Solutions of the HCl salt of N-1-hexadecylamine were prepared by dispersing 5.25 g of N-1-hexadecylamine in 100 mL of solution with an HCl concentration equal to that required to convert the amine to its ammonium salt. This mass of N-1-hexadecylamine was equal to 7.5% of the weight of amylose (dry basis) in 110.4 g of high amylose corn starch. The acidified amine dispersions were then heated to 90° C. to obtain clear solutions. The hot solutions of fatty ammonium salts were then added to the hot starch dispersions, and the dispersions were blended for 1 min and then cooled in ice water to 25° C. The amylose-N-1-hexadecylammonium salt complex was then isolated by freeze-drying providing a yield of approximately 97%.

Production of 1% N-1-hexadecylammonium chloride amylose inclusion complex (HexAm) in water solution: To 1.0 g of N-1-hexadecylammonium chloride amylose inclusion complex was added 99.0 g of water. With stirring, the mixture was heated to 80°-90° C. After reaching this temperature, the complex will have dissolved, and the solution should be rapidly be cooled. The solution can be used immediately or stored until needed.

Figure 2:
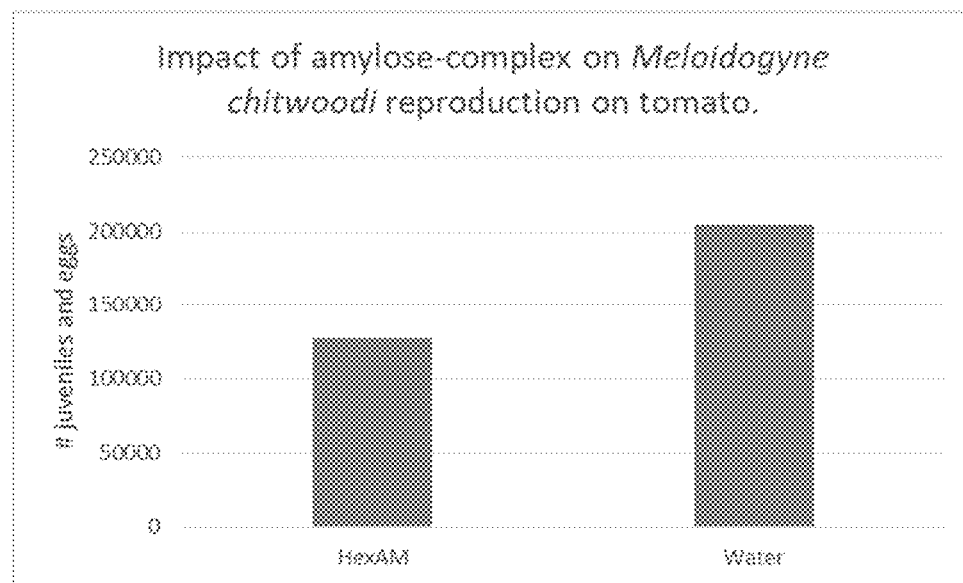
FIG. 2 shows the impact of amylose-complex on *Meloidogyne chitwoodi* reproduction on tomatoes as described below.

Nematocidal testing: The amylose-complex HexAM surprisingly killed soybean cyst nematode juveniles (J2) and inhibited egg hatch (*Heterodera glycines*; Tables 1 and 2), killed root-knot nematode J2 (*M. chitwoodi*; Table 3) in aqueous assays, and suppressed *M. chitwoodi* populations on tomato plants (FIG. 2). Populations of *Meloidogyne incognita* were also suppressed on tomato plants, but at the tested rate (75 ml of 1% HexAm to 515 g soil), differences between treatments with and without HexAm were not significant due to variability among pots (Table 4). In aqueous assays, *M. chitwoodi* J2 were exposed to the amylose-complex at concentrations ranging from 0.01% to 10%, and *H. glycines* eggs and J2 were exposed to concentrations ranging from 0.02% to 1.0%. For soybean cyst nematodes, surprisingly J2 were irreversibly killed at a concentration of 0.02% and egg hatch was reduced by 67% at the same concentration. Root-knot nematodes were surprisingly killed at concentrations of 0.01% (*M. chitwoodi*). In a soil test, the amylose-complex was drenched around a tomato plant planted in a sandy loam soil at a 1% rate in water after which *M. chitwoodi* juveniles were added to soil. A water control was included for comparison. After 13 weeks plants were destructively harvested and the number of nematodes in pots determined. Surprisingly, there was a 37% reduction in the number of *M. chitwoodi* recovered from amylose-complex-treated pots, which was significantly different from the water control (P=0.004) (FIG. 2). C12, C14 and C18 surprisingly killed *Meloidogyne incognita* juveniles (J2) in aqueous assays (Table 5). The nematodes were exposed to the complexes at concentrations ranging from 0.02% to 1.0%. Surprisingly J2 were irreversibly killed at a concentration of 0.02%

Discussion: Laboratory assays demonstrated that HexAm was surprisingly active against second-stage juveniles (J2; the infective nematode stage) of two nematode genera: the soybean cyst nematode (*H. glycines*) and root-knot nematodes (*M. chitwoodi*). Additionally, the compound also surprisingly decreased hatch of the soybean cyst nematode. A greenhouse trial demonstrated that nematode populations were surprisingly suppressed on tomato with HexAM treatment. Laboratory assays also demonstrated that C12, C14 and C18 were surprisingly active against second-stage juveniles (J2) of the root-knot nematode *Meloidogyne incognita*. The level of suppression observed in laboratory assays is surprisingly comparable to other products currently available in the marketplace for plant-parasitic nematode suppression.

Thus, in view of the above, there is described (in part) the following:

A method for killing nematodes, said method comprising (or consisting essentially of or consisting of) contacting said nematodes with an effective nematodes killing amount of a fatty-ammonium salt polysaccharide inclusion complex, and optionally a carrier.

The above method, wherein the polysaccharide portion is amylose derived from high amylose corn starch.

The above method, wherein the fatty amine portion of the inclusion complex is derived from one or more fatty ammonium salts, wherein each fatty ammonium salt comprises eight to twenty-two carbons in at least one chain attached to a nitrogen. The above method, wherein the one or more fatty ammonium salts comprise twelve to eighteen carbons.

The above method, wherein the fatty amine portion of the inclusion complex comprises an amine with two carbon chains attached to a nitrogen and wherein the two chains attached to the nitrogen and the two chains have from about 1-18 carbons each and the total number of carbons in the two chains is between 10 and 20.

The above method, wherein the amine from which the ammonium salt is derived is a primary, secondary, tertiary, or quaternary amine. The above method, wherein the amine is a secondary or tertiary amine comprising a first chain of twelve or more carbons, and wherein the second, third and fourth alkyl groups attached to the nitrogen have four or fewer (as low as one carbon) carbons and wherein the second, third and fourth alkyl groups do not comprise hydroxyl groups.

The above method, wherein the fatty amine portion of the inclusion complex is derived from a fatty ammonium salt selected from the group consisting of N-1-octadecylammonium chloride, N-1-dodecylammonium chloride, N,N-di-1-decyl-N-methylammonium chloride, N1-tetradecylammonium chloride, N-1-hexadecylammonium chloride, N,N-di-1-octylammonium chloride, N-1-dodecylanilium chloride, N-methyl-N-1-octadecylammonium chloride, N,N-dimethyl-N-1-hexadecylammonium chloride, N,N,N-trimethyl-N-1-tetradecylammonium chloride, N-1-hexadecyl-N,N,N-trimethylammonium bromide, benzethonium chloride, N-1-hexadecylpyridinium chloride, and N-1-laurylcholine chloride. The above method, wherein the fatty ammonium salt is N-1-hexadecylammonium chloride and is present at a concentration of 3-15% of the polysaccharide portion of the inclusion complex.

The term "consisting essentially of" excludes additional method (or process) steps or composition components that substantially interfere with the intended activity of the method (or process) or composition, and can be readily determined by those skilled in the art (for example, from a consideration of this specification or practice of the invention disclosed herein).

The invention illustratively disclosed herein suitably may be practiced in the absence of any element (e.g., method (or process) steps or composition components) which is not specifically disclosed herein. Thus, the specification includes disclosure by silence ("Negative Limitations In Patent Claims," AIPLA Quarterly Journal, Tom Brody, 41(1): 46-47 (2013): " . . . Written support for a negative limitation may also be argued through the absence of the excluded element in the specification, known as disclosure by silence . . . Silence in the specification may be used to establish written description support for a negative limitation. As an example, in Ex parte Lin [No. 2009-0486, at 2, 6 (B.P.A.I. May 7, 2009)] the negative limitation was added by amendment . . . In other words, the inventor argued an example that passively complied with the requirements of the negative limitation . . . was sufficient to provide support . . . This case shows that written description support for a negative limitation can be found by one or more disclosures of an embodiment that obeys what is required by the negative limitation . . . ."

While the invention has been described with reference to details of the illustrated embodiments, these details are not intended to limit the scope of the invention as defined in the appended claims. The embodiment of the invention in which exclusive property or privilege is claimed is defined as follows:

TABLE 1

*Heterodera glycines* second-stage juvenile (J2) activity and viability in different doses of HexAM. The assays were conducted with previously hatched J2 immersed in the compounds. Activity is defined as movement of the J2; viability as activity in the water rinse.

| HexAM treatment | Day 1 % active J2$^a$ | Day 2 % active J2$^a$ | Day 3 rinsed % viable J2$^{ab}$ |
| --- | --- | --- | --- |
| 0.0% (water) | 87.1 a | 80.3 a | 64.6 a |
| 0.02% | 0.0 c | 0.0 b | 0.0 b |
| 0.20% | 1.1 c | 0.0 b | 0.0 b |
| 1.0% | 18.7 b | 0.0 b | 0.0 b |

Two trials were conducted.

$^a$Means within a column followed by the same letter are not significantly different according to Wilcoxon each pair nonparametric multiple comparisons and confidence interval comparisons with means having values of 0 ($P \leq 0.05$).

$^b$Rinsed: after J2 activity counts on Day 2, treatments were removed and replaced with water.

TABLE 2

*Heterodera glycines* egg hatch and second-stage juvenile (J2) activity in different doses of HexAM. The assays were conducted with eggs immersed in the compounds. Activity is defined as movement of the J2.

| HexAM treatment | Day 2 Total egg hatch a | Day 2 % active J2 b | Day 5 Total egg hatch a | Day 5 % active J2 b | Day 7 Total egg hatch a | Day 7 % active J2 b |
| --- | --- | --- | --- | --- | --- | --- |
| 0.0% (water) | 16.8 a | 81.0 a | 27.0 a | 67.6 a | 31.4 a | 69.0 a |
| 0.02% | 8.9 b | 0.8 b | 9.0 b | 0.0 b | 9.1 b | 0.0 b |
| 0.20% | 3.3 b | 0.0 b | 3.4 c | 0.0 b | 3.4 c | 0.0 b |
| 1.0% | 3.1 b | 0.0 b | 3.1 c | 0.0 b | 3.1 c | 0.0 b |

Two trials were conducted.

a Means within a column followed by the same letter are not significantly different according to Tukey's adjustment for multiple comparisons and confidence interval comparisons with means having values of 0 ($P \leq 0.05$).

b Means within a column followed by the same letter are not significantly different according to Wilcoxon each pair nonparametric multiple comparisons and confidence interval comparisons with means having values of 0 ($P \leq 0.05$).

TABLE 3

*Meloidogyne chitwoodi* second-stage juvenile
(J2) activity in different doses of HexAM.

| HexAM treatment | Day 2 % active J2[a] |
|---|---|
| 0.00% | 91.2 a |
| 0.01% | 0.0 b |
| 1.00% | 0.0 b |
| 10.00% | 0.0 b |

[a]Means within a column followed by the same letter are not significantly different according to Wilcoxon each pair nonparametric multiple comparisons (P ≤ 0.05).

TABLE 4

Impact of HexAM on *Meloidogyne incognita* (southern root-knot nematode; RKN) reproduction on tomato in the greenhouse.

| HexAM Treatment | Number of eggs per root system[a] | Number of eggs per gram of root[a] |
|---|---|---|
| Water + RKN | 55,728.0 a | 2,166.4 a |
| Hex AM + RKN | 33,672.0 a | 1,444.9 a |

One trial was conducted.
[a]The number of eggs per root system and number of eggs per gram of root were each analyzed using PROC TTEST (SAS Institute). The assumptions of the model were checked. Means with different letters are statistically different at <0.05 significance level.

TABLE 5

*Meloidogyne incognita* second-stage juvenile (J2) activity
and viability in different doses of C12, C14 and C18.
The assays were conducted with previously hatched J2 immersed
in the compounds. Activity is defined as movement of the
J2; viability as activity in the water rinse.

| Treatment[a] | Day 1 % active J2[b] | Day 2 % active J2[b] | Day 3 rinsed % viable J2[bc] |
|---|---|---|---|
| 0.0% (water) | 87.5 a | 94.1 a | 96.4 a |
| C12, 0.02% | 4.8 e | 0.0 f | 0.8 c |
| C12, 0.20% | 76.3 ab | 61.9 c | 69.2 b |
| C12, 1.0% | 54.4 bc | 26.3 d | 52.8 b |
| C14, 0.02% | 1.1 e | 0.0 f | 0.0 c |
| C14, 0.20% | 3.5 e | 0.0 f | 0.0 c |
| C14, 1.0% | 52.2 c | 11.9 de | 7.1 c |
| C18, 0.02% | 18.2 d | 0.6 f | 0.0 c |
| C18, 0.20% | 27.3 d | 7.0 ef | 3.5 c |
| C18, 1.0% | 73.1 a | 77.1 b | 65.5 b |

One trial was conducted.
[a]C12 = Amylose (95%) complexed with N-1 dodecyl ammonium chloride (5%); C14 = Amylose (95%) complexed with N-1 tetradecyl ammonium chloride (5%); C18 = Amylose (95%) complexed with N-1 octadecyl ammonium chloride (5%).
[b]Means within a column followed by the same letter are not significantly different according to Wilcoxon each pair nonparametric multiple comparisons (P ≤ 0.05).
[c]Rinsed: after J2 activity counts on Day 2, treatments were removed and replaced with water.

We claim:

1. A method for killing nematodes, said method comprising contacting said nematodes with an effective amount of a fatty-ammonium salt polysaccharide inclusion complex to kill said nematodes, and optionally a carrier.

2. The method of claim 1, wherein the polysaccharide portion is amylose derived from high amylose corn starch.

3. The method of claim 1, wherein the fatty amine portion of the inclusion complex is derived from one or more fatty ammonium salts, wherein each fatty ammonium salt comprises eight to twenty-two carbons in at least one chain attached to a nitrogen.

4. The method of claim 3, wherein the one or more fatty ammonium salts comprise twelve to eighteen carbons.

5. The method of claim 1, wherein the fatty amine portion of the inclusion complex comprises an amine with two carbon chains attached to a nitrogen and wherein the two chains attached to the nitrogen and the two chains have from about 1-18 carbons each and the total number of carbons in the two chains is between 10 and 20.

6. The method of claim 1, wherein the amine from which the ammonium salt is derived from a primary, secondary, tertiary, or quaternary amine.

7. The method of claim 6, wherein the amine is a secondary, tertiary or quaternary amine comprising a first chain of twelve or more carbons, and wherein the second, third, or quaternary alkyl groups attached to the nitrogen have four or fewer carbons and wherein the second, third and quarternary alkyl groups do not comprise hydroxyl groups.

8. The method of claim 1, wherein the fatty amine portion of the inclusion complex is derived from a fatty ammonium salt selected from the group consisting of N-1-octadecylammonium chloride, N-1-dodecylammonium chloride, N,N-di-1-decyl-N-methylammonium chloride, N-1-tetradecylammonium chloride, N-1-hexadecylammonium chloride, N,N-di 1-octylammonium chloride, N-1-dodecylanilium chloride, N-methyl-N-1-octadecylammonium chloride, N,N-dimethyl-N-1-hexadecylammonium chloride, N,N,N-trimethyl-N-1-tetradecylammonium chloride, N-1-hexadecyl-N,N,N-trimethylammonium bromide, benzethonium chloride, N-1-hexadecylpyridinium chloride, and N-1-laurylcholine chloride.

9. The method of claim 8, wherein the fatty ammonium salt is N-1-hexadecylammonium chloride and is present at a concentration of 3-10% of the polysaccharide portion of the inclusion complex.

10. The method of claim 1, wherein the fatty amine portion of the inclusion complex is derived from one or more fatty ammonium salts, wherein each fatty ammonium salt comprises twelve to twenty carbons in at least one chain attached to a nitrogen.

11. The method of claim 1, wherein the amine from which the ammonium salt is derived from a primary amine.

12. The method of claim 1, wherein the fatty amine portion of the inclusion complex is derived from a fatty ammonium salt selected from the group consisting of N-1-octadecyl ammonium chloride, N-1-dodecylammonium chloride, N-1-tetradecylammonium chloride, and N-1-hexadecylammonium chloride.

* * * * *